US006882372B2

(12) United States Patent
Miller

(10) Patent No.: US 6,882,372 B2
(45) Date of Patent: Apr. 19, 2005

(54) METHOD AND SYSTEM FOR COLOR BALANCE CONTROL FOR COMPONENT VIDEO SIGNALS

(75) Inventor: William G. Miller, Knoxville, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 500 days.

(21) Appl. No.: 10/011,621

(22) Filed: Dec. 6, 2001

(65) Prior Publication Data

US 2003/0107680 A1 Jun. 12, 2003

(51) Int. Cl.[7] .................................................. H04N 9/66
(52) U.S. Cl. ..................... 348/638; 348/649; 348/655
(58) Field of Search ................................ 348/638, 641, 348/655, 656, 659, 661, 649

(56) References Cited

U.S. PATENT DOCUMENTS

| | | | | |
|---|---|---|---|---|
| 3,585,285 A | * | 6/1971 | Rennick | 348/506 |
| 3,597,639 A | * | 8/1971 | Harwood | 327/247 |
| 4,343,018 A | * | 8/1982 | Niimura et al. | 348/647 |
| 4,365,265 A | * | 12/1982 | Tsujita et al. | 348/656 |

* cited by examiner

*Primary Examiner*—Victor R. Kostak
(74) *Attorney, Agent, or Firm*—Edward W. Goodman

(57) ABSTRACT

A method and system are provided for balance control for component video signals. The system and method of the present disclosure allow for adjusting or compensating for possible color encoding errors, as well as allowing individual viewer preferences to be accommodated, in consumer electronics devices, such as high definition monitors and other imaging devices and appliances. The system includes circuitry for receiving the U and V component video signals and outputting balance adjusted component color difference signals Uout and Vout.

23 Claims, 2 Drawing Sheets

METHOD AND SYSTEM FOR COLOR BALANCE CONTROL FOR COMPONENT VIDEO SIGNALS

BACKGROUND OF THE INVENTION

1. Technical Field

The present disclosure relates generally to balance control, and more particularly, to a method and system for balance control, as opposed to tint control, for component video signals.

2. Background of the Related Art

Common practice when decoding NTSC signals is for a "tint" or "hue" adjustment to compensate for possible differential phase errors between a QAM chroma signal and its accompanying burst reference. Tint adjustment is also useful in compensating for other possible system errors.

Additionally, tint adjustment together with saturation adjustment allows for variations in personal preference to be accommodated, permitting any color to be shifted in saturation and hue without affecting the gray scale. In order to retain this capability for video signals that do not experience NTSC decoding, such as component video signals, e.g., from a DVD player or set-top box, it is generally necessary to apply tint adjustment to the baseband color difference signals.

The three main component video signals as known in the art are Y, B−Y and R−Y. Derived from the Y, B−Y and R−Y component video signals, Y/U/V and Y/Pb/Pr are defined as follows: U=(B−Y)/2.03, V=(R−Y)/1.14, Pb=(B−Y)/1.772 and Pr=(R−Y)/1.402. U and V amplitude scaling is applied in encoding an NTSC signal to prevent RF overmodulation as known in the art. Pb and Pr amplitude scaling is applied to parallel component video signals to make each signal approximately equal to 0.7 Volt p-p.

Prior art tint control circuitry, as shown by FIG. 1, derive the bi-directional crosstalk components, i.e., +/−kU for coupling into V and −/+kV for coupling into U, necessary for tint control. The opposite polarities associated with the bi-directional crosstalk components are significant, since they are equivalent to the effect of a tint control in NTSC decoding which is derived as follows:

As known in the art, an NTSC chroma signal may be represented as follows: $C(t)=[V \cos \omega t + U \sin \omega t]$, $\omega = 2\pi f_{sc}$. Therefore, demodulating V and U with $2 \cos(\omega t \pm \phi)$ and $2 \sin(\omega t \pm \phi)$, respectively, and tint range being $\pm \phi$, the bi-directional crosstalk components can be derived.

$V_{demodulation}=[V \cos(\omega t)+U \sin(\omega t)]2 \cos(\omega t \pm \phi)=2V \cos(\omega t)\cos(\omega t \pm \phi)+2U \sin(\omega t)\cos(\omega t \pm \phi)$ $=V[\cos(2\omega t \pm \phi)+\cos(\pm \phi)]+U[\sin(2\omega t \pm \phi)-\sin(\omega \phi)]$ $=V \cos(\pm \phi)-U \sin(\omega \phi)$, disregarding $2\omega t$ terms $=V-U \sin(\omega \phi)$, for small values of $\phi$ $=V-kU, k=\sin \phi$ $U_{demodulation}=[V \cos(\omega t)+U \sin(\omega t)]2 \sin(\omega t \pm \phi)=2V \cos(\omega t)\sin(\omega t \pm \phi)+2U \sin(\omega t)\sin(\omega t \pm \phi)$ $=V[\sin(2\omega t \pm \phi)+\sin(\pm \phi)]-U[\cos(2\omega t \pm \phi)-\cos(\pm \phi)]$ $=U \cos(\pm \phi)+V \sin(\pm \phi)$, disregarding $2\omega t$ terms $=U+V \sin(\pm \phi)$, for small values of $\phi$ $=U+kV, k=\sin \phi$ As evident from FIG. 1, prior art tint control circuitry for consumer electronics devices, such as high definition monitors and other imaging devices and appliances, in order to obtain the bi-directional crosstalk components +/−kU and +/−kV is generally complex. Further, the prior art tint control circuitry as shown by FIG. 1 employs two modulator/demodulator ICs, i.e., the MC1496 balanced modulator/demodulator ICs which contains eight transistors, and peripheral circuitry, which add to the cost of the high definition monitors and other imaging devices and appliances. Further still, the prior art tint control circuitry as shown by FIG. 1 and most other prior art tint control circuits introduce a variable amount of bi-directional, opposite polarity crosstalk between the component video channels.

A need therefore exists for an alternative method and system which provide a less complex and lower cost approach for adjusting or compensating for possible color encoding errors, as well as allowing individual viewer preferences to be accommodated. A method and system are also needed which do not introduce a variable amount of bi-directional, opposite polarity crosstalk between the component video channels.

SUMMARY OF THE INVENTION

The present disclosure provides a method and system for balance control, as opposed to tint control, for component video signals. The system and method of the present disclosure provide significant less complex circuitry and a less complex approach, respectively, as compared to prior art systems and methods, for adjusting or compensating for possible color encoding errors, as well as allowing individual viewer preferences to be accommodated, in consumer electronics devices, such as high definition monitors and other imaging devices and appliances. Additionally, the balance control system of the present disclosure is less expensive than typical prior art tint control circuits and systems.

The system of the present invention includes circuitry for receiving the Uin and Vin component video signals and outputting balance adjusted component color difference signals Uout and Vout. Specifically, the balance control system of the present invention for color balancing component video signals includes a first input for receiving a first component video signal; a second input for receiving a second component video signal; circuitry including a first differential amplifier and a second differential amplifier for receiving the first and second component video signals from the first and second inputs, respectively, and a variable voltage source; a first output connected to the circuitry for outputting a first color balanced signal for the first component video signal; and a second output connected to the circuitry for outputting a second color balanced signal for the second component video signal. The gain of the first and second color balanced output signals is dependent on the voltage of the variable voltage source.

BRIEF DESCRIPTION OF THE DRAWINGS

The invention is further explained by way of example and with reference to the accompanying drawings, wherein.

DETAILED DESCRIPTION OF PREFERRED EMBODIMENTS

Figure 1:
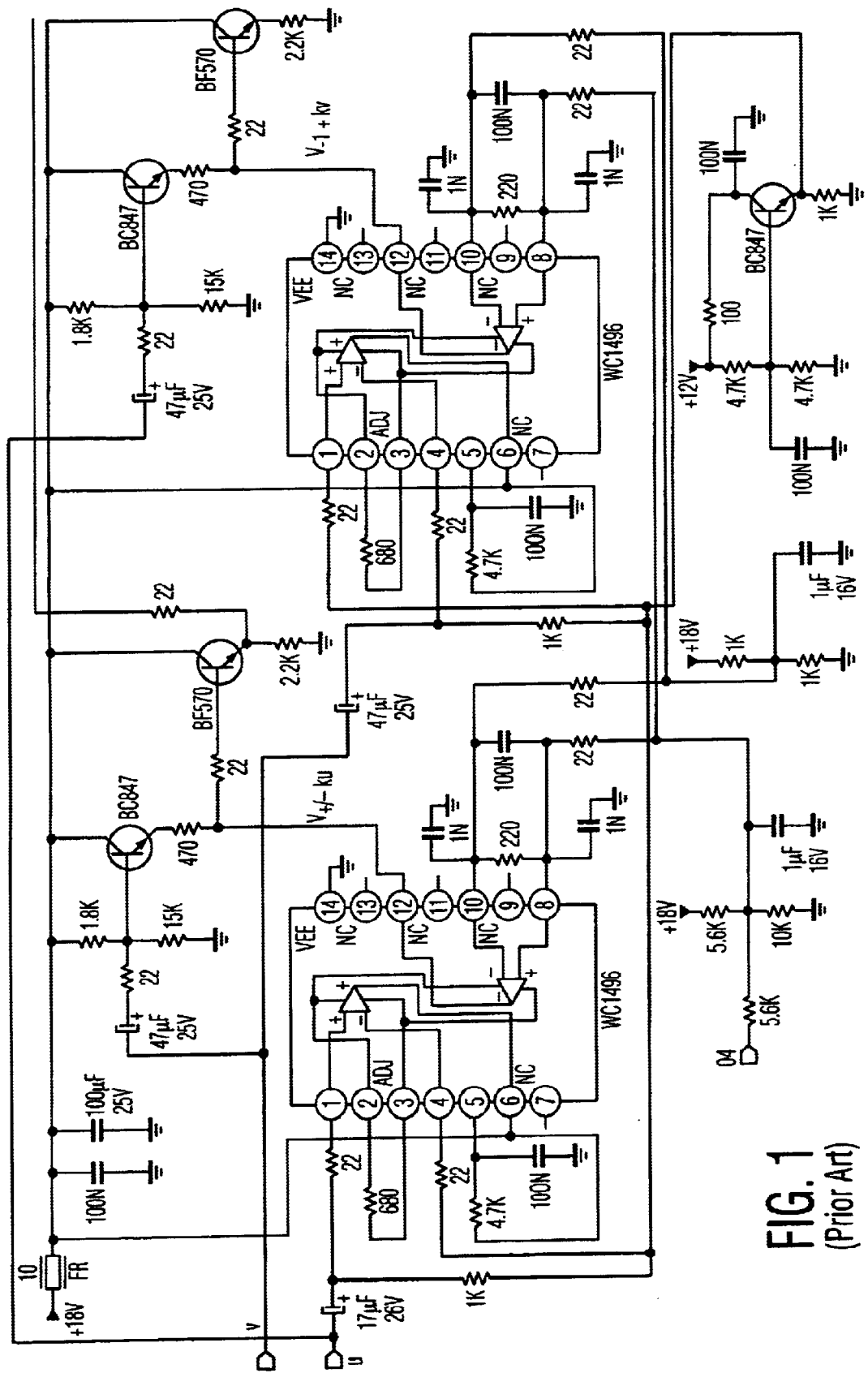
FIG. 1 is a schematic diagram of prior art circuitry for deriving the bi-directional crosstalk components necessary for tint control.
Figure 2:
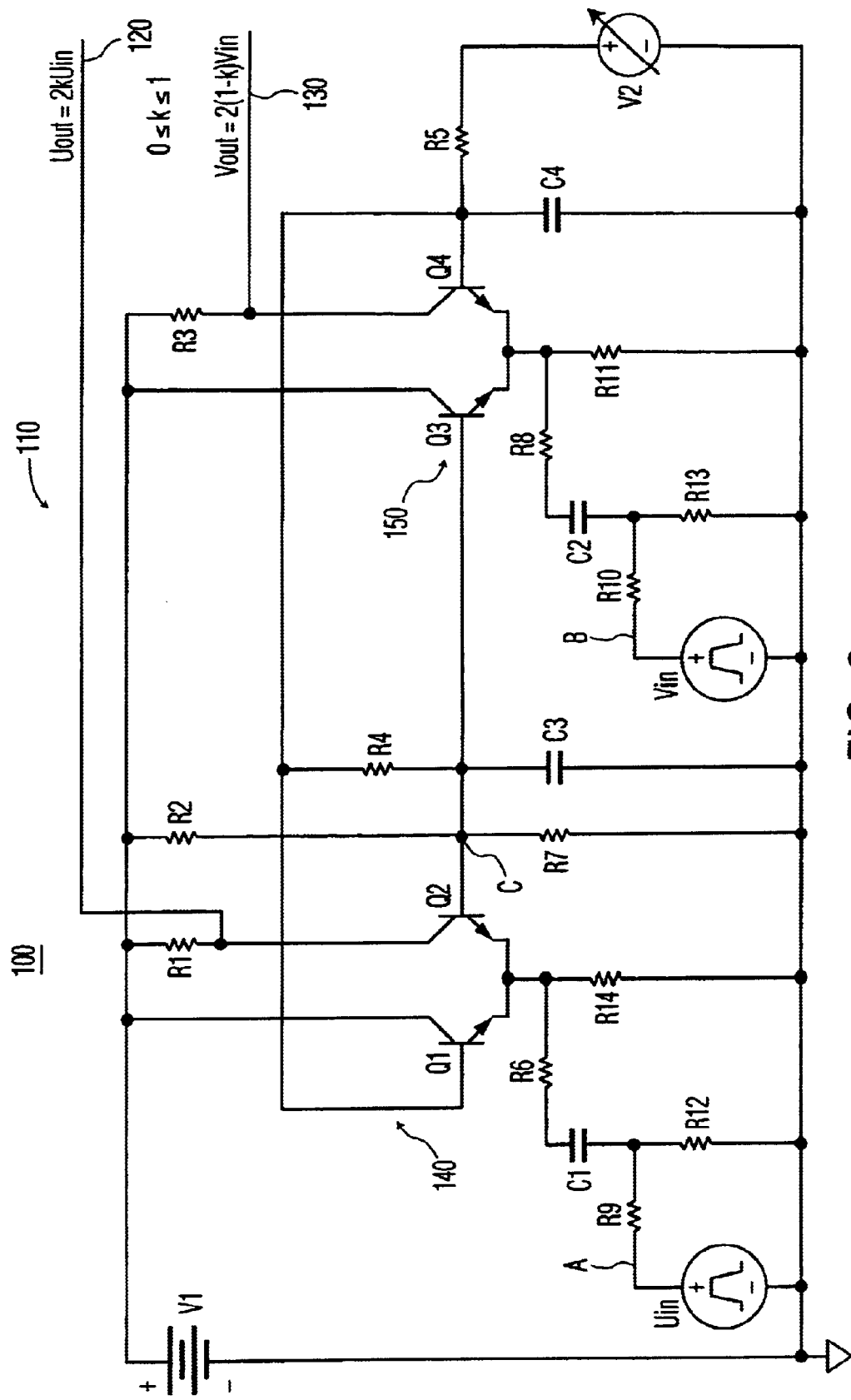
FIG. 2 is a schematic diagram of circuitry for receiving the Uin and Vin component video signals and outputting balance adjusted component color difference signals Uout and Vout according to the present invention.

FIG. 2 is a schematic diagram of a system having circuitry for receiving the U and V component video signals and outputting balance adjusted component color difference signals Uout and Vout according to the present invention. The system is designated generally by reference numeral 100 and includes circuitry 110 for receiving video component signals Uin and Vin. The circuitry 110 outputs balance adjusted component color difference signals Uout and Vout, where Uout equals 2 kUin and Vout equal 2(1−k)Vin, and where k is a constant greater than or equal to zero and less than or equal to one.

The circuitry 110 includes resistors R1–R14, capacitors C1–C4 and transistors Q1–Q4. Video component signal Uin is received at input "A" connected to a first terminal of resistor R9 and video component signal Vin is received at input "B" connected to a first terminal of resistor R10.

A second terminal of resistor R9 is connected to a first terminal of resistor R12 and a first terminal of capacitor C1. A second terminal of capacitor C1 is connected to a first terminal of resistor R6. A second terminal of resistor R6 is connected to a first terminal of resistor R14 and the emitters of transistors Q1 and Q2. The collector of transistor Q1 is connected to a positive terminal of a voltage source V1. The collector of transistor Q2 is connected to a first terminal of resistor R1 and an output 120 for outputting the balance adjusted component color difference signal Uout. A second terminal of resistor R1 is connected to the positive terminal of the voltage source V1.

The base of transistor Q1 is connected to a first terminal of resistor R4, a first terminal of resistor R5, a first terminal of capacitor C4, and the base of transistor Q4. The base of transistor Q2 is connected to a first terminal of resistor R2, a first terminal of resistor R7, a first terminal of capacitor C3, and the base of transistor Q3. The collector of transistor Q3 is connected to a second terminal of resistor R2 and a first terminal of resistor R3. The second terminal of resistor R5 is connected to a positive terminal of variable voltage source V2.

A second terminal of resistor R10 is connected to a first terminal of resistor R13 and a first terminal of capacitor C2. A second terminal of capacitor C1 is connected to a first terminal of resistor R8. A second terminal of resistor R8 is connected to a first terminal of resistor R11 and the emitters of transistors Q3 and Q4. The collector of transistor Q4 is connected to a second terminal of resistor R3 and an output 130 for outputting the balance adjusted component color difference signal Vout.

A second terminal of resistor R7, resistor R11, resistor R12, resistor R13, and resistor R14 are connected to ground. A second terminal of capacitor C3 and capacitor C4 are connected to ground. A negative terminal of voltage sources V1 and V2 is also connected to ground.

As an example, the following values may be used for suitable operation of the circuitry 110: resistors R1 and R3, 680 ohms; resistor R2, 750 ohms; resistor R4, 220 ohms; resistor R5, 2.2 kilo-ohms; resistors R6 and R8, 330 ohms; resistor R7, 250 ohms; resistors R9 and R10, 75 ohms; resistors R11 and R14, 470 ohms; resistors R12 and R13, 100 ohms; capacitors C1 and C2, 1 micro-farad; capacitors C3 and C4, 10 nano-farad; voltage source V1, 12 volts; and variable voltage source V2, variable.

Since the differential amplifiers 140 and 150 are commonly connected via the respective bases of the transistors Q1, Q4 and Q2, Q3, then using the values noted above, during operation of the circuitry 110 the input current through resistor R6 is split equally between transistors Q1 and Q2 when the base voltages of transistors Q1 and Q2 are equal. Similarly, the input current through resistor R8 is split equally between transistors Q3 and Q4 when the base voltage of transistors Q3 and Q4 are equal.

The ratio of resistance between resistors R14 and R4 is approximately 2:1. Therefore, the signal output at output 120 is two times the signal which is input at node "A", i.e., Uin, multiplied by the constant k, and the signal output at output 130 is two times the signal which is input at node "B", i.e., Vin, multiplied by (1−k). That is, Uout equals 2 kUin and Vout equals 2(1−k)Vin as indicated above.

The balance adjustment provided by the circuitry 110 allows for the relative levels of the component color difference signals to be adjusted by the viewer. As can be appreciated by one ordinarily skilled in the art, if the above values for the resistors, capacitors and voltage sources are used, at a nominal, mid-setting of the variable voltage source V2, i.e., approximately 3 volts, such that the voltage at node "C" is also approximately 3 volts due to the one-quarter resistor divider formed by resistors R2 and R7 (¼ of 12 volts is 3 volts), the relative gains of the component video signals Uin and Vin are unaltered (k is approximately equal to one-half). Varying the variable voltage source V2 below the nominal, mid-setting, increases the gain of Uout and decreases the gain of Vout (k is equal or approximately equal to one). Varying the variable voltage source V2 above the nominal, mid-setting, increases the gain of Vout and decreases the gain of Uout k is equal or approximately equal to zero).

Accordingly, during operation of the circuitry 110, the Uin and Vin component video signals are color balanced. High accuracy and stability is ensured, due to the two balanced differential amplifiers 140, 150. The first differential amplifier 140 is mainly formed by transistors Q1 and Q2 and resistor R1, and the second differential amplifier 150 is mainly formed by transistors Q3 and Q4 and resistor R3.

Further, during operation of the circuitry 110, all of the transistors Q1-Q4 are active at all times. During a variation of the variable voltage source V2, i.e., a balance control voltage range, the current is split between transistors Q1 and Q2 and transistors Q3 and Q4. The system 100 is designed such that the current is split by having transistor Q1 conduct less than transistor Q2 if the voltage output by the variable voltage source V2 is lower than 3 volts, such that the gain of transistor Q2 is increased and the gain of transistor Q4 is decreased. Likewise, the current is split by having transistor Q3 conduct less than transistor Q4 if the voltage output by the variable voltage source V2 is higher than 3 volts, such that the gain of transistor Q4 is increased and the gain of transistor Q2 is decreased. Hence, the gain of the transistor Q2 is approximately inversely proportional to the gain of transistor Q4. Accordingly, the gain of the color balanced output signals Uout and Vout are dependent on the voltage of the variable voltage source V2 and are approximately inversely proportional.

It will be understood that various modifications may be made to the embodiments disclosed herein and that the above description should not be construed as limiting, but merely as exemplifications of preferred embodiments. Accordingly, those skilled in the art will envision other modifications within the scope and spirit of the claims appended hereto.

What is claimed is:

1. A balanced color control system for component video signals comprising:
   a first input for receiving a first component video signal;
   a second input for receiving a second component video signal;
   circuitry including a first differential amplifier and a second differential amplifier for receiving the first and second component video signals from the first and second inputs, respectively, and a variable voltage source;
   a first output connected to the circuitry for outputting a first color signal for the first component video signal; and
   a second output connected to the circuitry for outputting a second color signal for the second component video signal, said first and second color signals being balanced with respect to each other, wherein gains of the first and second color signals are inversely dependent on the voltage of the variable voltage source.

2. The system claimed in claim 1, wherein the first color signal is represented as 2kUin, where Uin represents the first component video signal and k has a value greater than or equal to zero and less than or equal to one, k being proportional to the voltage of the variable voltage source.

3. The system as claimed in claim 1, wherein the second color signal is represented as 2(1−k)Vin, where Vin represents the second component video signal and k has a value greater than or equal to zero and less than or equal to one, k being proportional to the voltage of the variable voltage source.

4. The system as claimed in claim 1, wherein the first and second differential amplifiers each include a pair of transistors.

5. The system as claimed in claim 4, wherein a base of a respective transistor of the pair of transistors of the first differential amplifier is directly connected to a base of a respective transistor of the pair of transistors of the second differential amplifier.

6. The system as claimed in claim 4, wherein the emitters of each pair of transistors are connected to ground via a resistor.

7. The system as claimed in claim 4, wherein a collector of one transistor of the pair of transistors of the first differential amplifier is connected to the first output.

8. The system as claimed in claim 4, wherein a collector of one transistor of the pair of transistors of the second differential amplifier is connected to the second output.

9. The system as claimed in claim 4, wherein a base of one transistor of the pair of transistors of the second differential amplifier is connected to the variable voltage source via a resistor.

10. The system as claimed in claim 4, wherein the collectors of each pair of transistors is connected to a voltage source.

11. The system as claimed in claim 1, wherein the gain of the first color balanced output signal is approximately inversely proportional to the gain of the second color balanced output signal.

12. A method for balanced color control of component video signals, the method comprising the steps of:
   receiving a first component video signal;
   receiving a second component video signal;
   providing circuitry including a first differential amplifier and a second differential amplifier for receiving the first and second component video signals, respectively, and a variable voltage source; and
   varying the voltage of the variable voltage source for varying a gain of a first color signal for the first component video signal inversely proportional to a gain of a second color signal for the second component video signal, such that said first and second color signals are balanced.

13. The method as claimed in claim 12, wherein the first color signal is represented as 2kUin, where Uin represents the first component video signal and k has a value greater than or equal to zero and less than or equal to one, k being proportional to the voltage of the variable voltage source.

14. The method as claimed in claim 12, wherein the second color signal is represented as 2(1−k)Vin, where Vin represents the second component video signal and k has a value greater than or equal to zero and less than or equal to one, k being proportional to the voltage of the variable voltage source.

15. The method as claimed in claim 12, wherein the first and second differential amplifiers each include a pair of transistors.

16. The method as claimed in claim 15, wherein a base of a respective transistor of the pair of transistors of the first differential amplifier is directly connected to a base of a respective transistor of the pair of transistors of the second differential amplifier.

17. The method as claimed in claim 15, wherein the emitters of each pair of transistors are connected to ground via a resistor.

18. The method as claimed in claim 15, wherein a collector of one transistor of the pair of transistors of the first differential amplifier is connected to the first output.

19. The method as claimed in claim 15, wherein a collector of one transistor of the pair of transistors of the second differential amplifier is connected to the second output.

20. The method as claimed in claim 15, wherein a base of one transistor of the pair of transistors of the second differential amplifier is connected to the variable voltage source via a resistor.

21. The method as claimed in claim 15, wherein the collectors of each pair of transistors is connected to a voltage source.

22. The method as claimed in claim 12, wherein the gain of the first color balanced output signal is approximately inversely proportional to the gain of the second color balanced output signal.

23. A balanced color control system for component video signals comprising:
   first input means for receiving a first component video signal;
   second input means for receiving a second component video signal;
   means for varying gain of the first component video signal inversely proportional to a gain of the second component video signal to provide balanced first and second color signals corresponding, respectively, to the first and second component video signals;
   first output means for outputting the first color signal corresponding to the first component video signal; and
   second output means for outputting the second color signal corresponding to the second component video signal.

* * * * *